United States Patent [19]

Huebler et al.

[11] 3,855,403

[45] Dec. 17, 1974

[54] OXYGEN ENRICHMENT PROCESS

[75] Inventors: Jack Huebler, Deerfield, Ill.; Lester G. Massey, Moreland Hills, Ohio; Paul B. Tarman, Elmhurst, Ill.

[73] Assignee: Consolidated Natural Gas Service Co., Cleveland, Ohio

[22] Filed: July 30, 1973

[21] Appl. No.: 383,815

Related U.S. Application Data

[62] Division of Ser. No. 242,153, April 7, 1972, Pat. No. 3,773,680.

[52] U.S. Cl. .................. 423/579, 60/39.02, 423/583
[51] Int. Cl. .................... C01b 13/08, C01b 15/04
[58] Field of Search .......................... 423/579, 583

[56] References Cited
UNITED STATES PATENTS

| | | | |
|---|---|---|---|
| 3,324,654 | 6/1967 | Squires | 60/39.02 |
| 1,048,812 | 12/1912 | Doherty | 423/583 |

OTHER PUBLICATIONS

John L. Moriarty, Jr.; "The Effects of Catalytic or Promoter Oxides on The Brin Process," Proc. Iowa Acad. Sci. 77, 360–378, Apr. 10, 1971.

*Primary Examiner*—Oscar R. Vertiz
*Assistant Examiner*—Hoke S. Miller
*Attorney, Agent, or Firm*—Molinare, Allegretti, Newitt & Witcoff

[57] ABSTRACT

Special oxygen acceptor compositions for the production of oxygen in modified Brin-type processes. The compositions comprise a physical mixture of finely ground barium peroxide and dolomitic quicklime in which the weight percent of the dolomitic quicklime ranges up to about 92%. The use of dolomitic quicklime in conjunction with barium peroxide has been found to increase the oxygen production per mole of barium peroxide more than ten-fold. Typical operating conditions for production of oxygen in accord with the process utilizing the new material are 1–50 psia, at 1,350°–1600°F during the reduction (oxygen production) half of the cycle, and 40–200 psia, at 1,300°–1550°F during the oxidation half of the cycle. The cycle time for production is substantially decreased. The particle size of the barium peroxide in the composition mixture is preferably smaller than about 100 mesh, while the dolomitic quicklime is preferably smaller than about 40 mesh. The dolomitic quicklime must be prepared under conditions to insure that the final carbonate content of the dolomitic quicklime-barium peroxide mixture is such that the mole ratio of carbon dioxide to barium peroxide is less than 1.0. The composition may be in various forms: powder, granular, pelletized, coated on saddle supports and the like. In addition to increased oxygen production per mole of barium peroxide and reduction in cycle times, a significant reduction in the amount of barium oxides required to produce oxygen at any given rate is exhibited by the compositions.

21 Claims, 3 Drawing Figures

COMPOSITION DIAGRAM
MOLE FRACTION

COMPOSITION DIAGRAM
MOLE FRACTION

EFFECT OF CARBON DIOXIDE ON MAXIMUM CONVERSION OF BARIUM PEROXIDE IN BARIUM PEROXIDE-DQL MIXTURE

OXYGEN ENRICHMENT PROCESS

This is a division of copending application Ser. No. 242,153, filed Apr. 7, 1972, now U.S. Pat. No. 3,773,680.

FIELD OF THE INVENTION

This invention relates to acceptor compositions for use in producing oxygen and enriching air, by so-called oxygen "absorbing" processes, such as modified Brin-type processes. More specifically, the invention relates to compositions of dolomitic quicklime with barium peroxide which greatly enhances the activity of barium peroxide in such processes and provides faster reaction rates and better gas conversions. This invention also relates to processes employing the new material.

BACKGROUND OF THE INVENTION

Processes for the production of oxygen, which include the enrichment of air by increasing its total oxygen content above the approximately 21% found in air, can be broadly divided into two classes: (1) mechanical, and (2) chemical. The mechanical processes generally include compression of air followed by cryogenic distillation. Such processes from the point of view of energy and economics have resulted in their almost exclusive use.

Chemical processes include oxygen production as a result of electrolysis of water, and so-called "absorption" processes such as those of Brin and DuMotay. These latter processes involve the reversible "absorption-desorption" of oxygen by chemical compounds under controlled conditions of temperature and pressure.

The DuMotay process of 1866 involves the use of sodium manganate which may be in liquid form. This process remains essentially a laboratory curiosity, and is not a significant commercial process.

The Brin-type processes are based on the 1851 discovery by Boussingault that barium oxide, when heated a dull red, "absorbs" oxygen, and when heated to higher temperature gave off the "absorbed" oxygen. This led to the first commercial production of oxygen starting in about 1881 and continuing for about 20 years by the Brin brothers of France. As described in the Brin British patent of 1885, No. 157, they used a three-step process which involved first, the removal of $CO_2$ from air, then passing the dried $CO_2$-free air through or over a retort of baryta (barium oxide, BaO) at a temperature of 500 – 600°C (932° – 1112°F) to "absorb" oxygen, and third, the oxygen was withdrawn from the barium oxide by a vacuum creating means. The temperature ordinarily was raised to about 800°C (1472°F) during the third stage. This gave rise to what is commonly known as the heat cycle variation of the Brin process. A complete cycle took from 3 to 4 hours.

In the Brin British patent of 1885, No. 151, the manufacture of the barium oxide used in the process of the No. 157 patent was described. A "nitrate of baryta" was heated to high temperature of from 1,000°.– 1,500°C in a closed vessel and was then cooled in a vacuum to produce the baryta.

The Jensen British patent of 1880, No. 1416, was another Brin process patent in which compressed air was used in the retorts. This gave rise to the pressure cycle variation of the Brin process. The use of air under pressure apparently ensured a complete and uniform "absorption" of oxygen in the entire mass of the barium oxide. In this process, the temperature was maintained relatively constant for economic reasons. Although authorities differ as to the exact pressure used, it has been variously reported that the air was forced in at a pressure of from 10 to 15 pounds or 25 to 30 psia, while the oxygen was drawn off under a vacuum of 13 to 14 pounds or 1 psia. While the cycle time was relatively short, being reported to be on the order of about 10 minutes, the output was low.

More recently, Squires U.S. Pat. No. 3,324,654 shows a Brin-type process for the simultaneous production of oxygen and power wherein the compressed air is let down through an expansion turbine to recover energy values in the compressed air. The oxygen "absorbing" bed is a solid composed of an intimate intermingling of tiny crystallites of barium oxide and magnesium oxide. In the process, the bed must be mixed periodically. The crystallites are prepared from a coprecipitated barium carbonate and magnesium carbonate mixture which is pelletized with active carbon and, optionally, a starch paste binder. These pellets are dried and heated to 1,200°F under a CO atmosphere to decompose the $MgCO_3$ to form MgO, and then further heated to 1,750°F to 1,800°F under $N_2$ to "react" the carbon with the $BaCO_3$.

In a recent publication my Moriarty, Moriarty, John L., Jr., *The Effects of Catalytic or Promotor Oxides on The Brin Process*, Proc. Iowa Acad. Sci. 77, 360–78, Apr. 10, 1971, the influence of 18 oxides as reaction promotors was studied and the results of forty admixture experiments (apparently binary mixtures) were evaluated. The experimental evidence reported there by Moriarty led him to state that it "supports the conclusion that the reversible $BaO$-$BaO_2$ reaction is not, in general, substantially improved by the employment of foreign oxide additions." BaO was mixed, in several types of preparations, with the following oxides: $La_2O_3$, MgO, $Fe_2O_3$, CoO, CuO, CdO, $SiO_2$, $CeO_2$, $Al_2O_3$, ZnO, NiO, CaO, SrO, $Ag_2O$, $MnO_2$, PbO, HgO, and $Na_2O_2$. Moriarty reported that $La_2O_3$ and MgO increase the oxygen yield rate when mixed with BaO, but that the physical arrangement of reaction bed and rapid evacuaction procedures appeared critical.

In spite of the many variations in the Brin processes which have been tried in the last century, there today is no substantial commercial process for production of oxygen or enrichment of air involving the use of barium oxides. Many industrial processes employ oxygen or oxygen enriched air, for example, steel making, glass making, aerobic fermentation processes, sewage treatment and various combustion processes. There is thus a significant need for a reliable and economical chemical process for oxygen production or enrichment of air with oxygen.

THE INVENTION

OBJECTS

It is among the objects of this invention to provide an improved Brin-type process for the production of oxygen and enrichment of air with oxygen.

It is another object of this invention to provide an improved oxygen enrichment process of the chemical type employing barium oxides.

It is another object of this invention to provide improved oxygen acceptor compositions for use in a chemical oxygen enrichment process.

It is another object to provide improved oxygen acceptor compositions and a process for their use which is reliable and economical.

It is another object of this invention to provide improved oxygen acceptor compositions and method for their use which exhibit faster reaction rates, better gas conversion, increased oxygen production and shorter cycle times than heretofore possible.

It is another object of this invention to provide an oxygen acceptor composition which has a relatively infinite lifetime in terms of cyclic reuse, and yet which is relatively simple to make, inexpensive, and can be stored and shipped under adverse conditions.

It is another object of this invention to provide an oxygen acceptor mixture comprising barium peroxide with dolomitic quicklime, which compositions show improved and unexpected results as compared to previously known compositions, and yet which are relatively insensitive to degradation by water vapor and inactivation by exposure to ambient atmospheric $CO_2$ under normal storage conditions, as compared to BaO.

It is another object of this invention to provide a chemical process of the modified Brin-type which is commercially feasible as compared to laboratory curiosities of the prior art.

It is another object of this invention to enhance the inherent low activity of barium oxides and thus make Brin-type processes into commercial realities.

Still other objects of this invention will become evident from reading the following description.

SUMMARY OF THE INVENTION

One aspect of this invention is the discovery that the addition of dolomitic quicklime, hereinafter DQL, greatly enhances the activity of barium oxides in Brin-type processes. A second aspect of this invention is the use of the bed material initially in the form of barium peroxide, $BaO_2$, rather than a prior art use of barium oxide.

DQL itself is inactive yet promotes the activity of the barium oxides. Faster reaction rate and better gas conversions are obtained by the use of $BaO_2$-DQL compositions of this invention. The addition of DQL has been found to increase the overall oxygen production per mole of barium peroxide more than 10-fold, and instantaneous rates as much as 23-fold.

Typical operating conditions for production of oxygen for enriching air in accord with the process aspect of this invention are: 1-50 psia at 1,350° – 1,600°F during the reduction (oxygen production) half of the cycle and 40-200 psia at 1,300° – 1,550°F during the oxidation half of the cycle.

We have found that physical mixing of finely ground barium peroxide with DQL increases the activity of barium oxides in both the oxidation and reduction halves of the cycle. The weight percent DQL useful in the mixtures of our invention range from 1 – 92%. The particle size of the barium peroxide is preferably smaller than about 100 mesh. The DQL particle size is smaller than about 40 mesh, preferably smaller than about 80 to 100 mesh.

A critical aspect of this invention is the discoverry that the oxygen acceptor composition must be relatively $CO_2$ free. The $BaO_2$ and DQL must be prepared and mixed under conditions which insure that the final carbonate content of the DQL-$BaO_2$ mixtures of this invention are such that the mole ratio of carbon dioxide to barium peroxide is less than 1.0. We have also discovered that the DQL may be derived from a variety of naturally available dolomites, but which must be calcined under conditions which insure the final carbonate content of the mixture is less than 1.0 mol $CO_2$/ mol $BaO_2$.

In connection with this critical $CO_2$ content, we have found that our material also provides the advantage that commercially available materials which are relatively $CO_2$ free can be used. No expensive, and difficult to control chemical precipitation or decomposition steps are required in the preparation of our bed mixture of DQL-$BaO_2$. We employ only simple blending, and optionally, compaction of the two raw materials required.

Another important aspect of the invention is the use of barium peroxide instead of barium oxide in the mixture with the DQL. The use of the barium peroxide significantly improves oxygen activity and minimizes the probability of hydration (formation of barium hydroxide through absorption of water), and carbonation (formation of barium carbonate), during preparation and storage of the active bed mixture. We have found that one source of inactivity and reduction in lifetime of bed materials is due to hydration and carbonation. Thus, we provide the initial bed material in an oxidized state, and our process involves termination of the process, for reasons of shutdown for repairs and the like, in the oxidation stage to insure the barium is in the peroxide state.

While we do not wish to be bound by theory, it is believed that starting initially with $BaO_2$, rather than the prior art use of BaO, provides naturally pre-formed and pre-filled oxygen sites in the composition matrix. The initial evolution of oxygen produces a "porosity" in the matrix, and the oxidation half of the cycle starts with "openings" of the appropriate molecular size in the matrix structure. As noted above, the prior art loosely uses the term "absorption" in connection with barium bed materials. However, since chemical reaction occurs in reversibly transforming solid BaO to $BaO_2$, the term "absorption" is a misnomer. While we do not wish to be bound by terminology, we believe that the term "acceptor" more generically described what happens to the mixtures of this invention during operation, whether the reversible, temporary binding of the oxygen be physical adsorption, or chemical bonding of various types. The use of our "acceptor mixtures" thus includes use in the prior art processes as they call for "absorbent" bed materials. We are sure that oxidation and reduction of the barium oxide-peroxide couple does occur in our mixtures, but it is also possible that physical adsorption occurs, since our bed material is a complex, synergistic mixture of the barium oxides with DQL.

In the process of this invention using our new DQL-$BaO_2$ mixtures, we may employ variation in pressure and/or temperature in the two halves of the cycle. In addition to enhancement of activity, we have discovered that the DQL provides still another advantage. That is, the high specific heat of the DQL relative to that of the barium oxides serves to store heat during the exothermic oxidation, and permits release of heat during the endothermic reduction. In operation, because the $BaO_2$ and DQL are in intimate mixture, endothermic and exothermic heats are provided for in close proximity to active sites; heat transport over more than infinitesimal distances is not required. This results in a reduction of overall temperature fluctuations which are detrimental to cyclic operation and gas conversions. We are thus able to employ reactors in which no heat exchange equipment is required for removal or addition of reaction heat. Likewise, our process does not require raking or rabbling the bed material from near the inlet entrance to the interior to compensate for non-uniform reaction or heat distribution.

The compositions of this invention may be used with any of the Brin-type processes, Whether they be of the basic Brin-type, the thermal or pressure cycle type processes, or of the more recent energy recovery modification as set forth in Squires U.S. Pat. No. 3,324,654. Our preferred mode of operation with the compositions of this invention is to produce oxygen, or oxygen enriched air, by cyclicly varying pressure at relatively constant temperature, so that the barium oxide in the bed is oxidized to barium peroxide using relatively high pressure air, and the barium peroxide is reduced to barium oxide using lower pressure air. The oxygen generated in the reduction may be recovered relatively pure, or may be mixed with purging lower pressure air, thereby consistently enriching its oxygen content to as much as 40%. The oxygen or enriched air may be used in all combustion processes, in the production of iron, steel, and glass, and in chemical processing such as synthesis gas production, sewage treatment, stream aeration, oxygen pyrolysis of municipal solid waste to produce fuel gas, and the like.

The DQL-$BaO_2$ mixtures of this invention may be used in various forms, either loose or compacted, the latter in such forms as pellets or on saddle supports.

The invention is described in more detail below with reference to the following figures of which:

FIG. 1 is a trilinear diagram of the three components of the acceptor mixtures in accordance with this invention as defined by the area between the lines A and B;

FIG. 2 illustrates the critical nature of the mole ratio of $CO_2/BaO_2$ as a function of the weight percent DQL in the bed material mixtures of this invention, and which additionally shows the preferred mixtures of this invention; and FIG. 3 illustrates the effect on the maximum cyclic conversion as a function of the mole ratio of $CO_2/BaO_2$ mixture for a typical range of mixtures of varying weight ratios of DQL/$BaO_2$.

In the following detailed description, the examples given therein are by way of illustration and not by way of limitation.

DETAILED DESCRIPTION AND EXAMPLES

Figure 1:
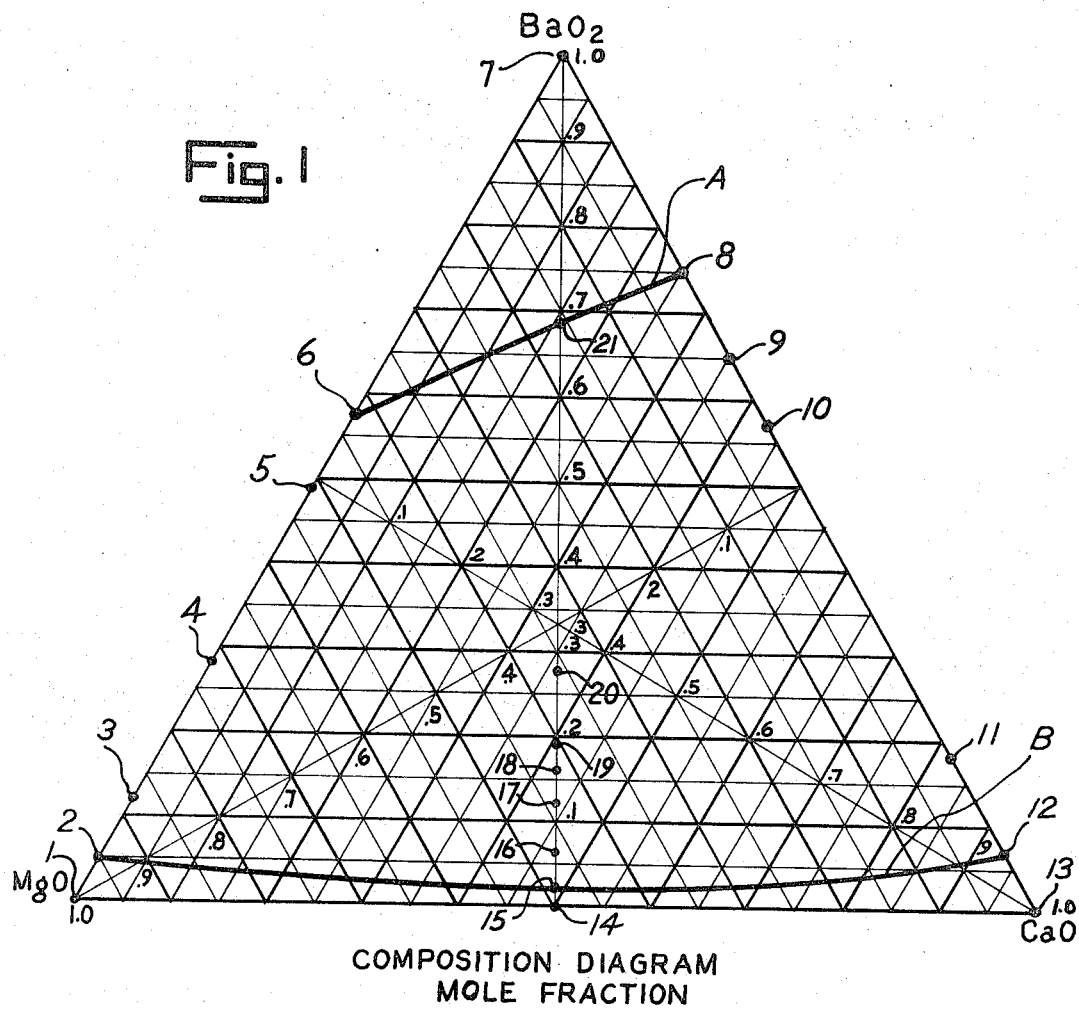

Mixtures in accordance with our invention may be prepared from various sources of dolomitic quicklime and barium peroxide. It is critical, however, to the activity of the mixtures in accordance with our invention that the carbon dioxide/barium peroxide mole ratio in the mixture be below 1.0, since we have found that the cyclic conversion drops to 0 as the carbon dioxide/barium peroxide mole ratio approaches 1.0. Conversely, we have found that as the carbon dioxide content in the DQL is reduced below this critical mole ratio value of 1.0 $CO_2/BaO_2$, the mixture shows a corresponding increase in the maximum cyclic conversion. Further, as the weight ratio of DQL in the DQL-$BaO_2$ mixtures increases, the critical value of the $CO_2/BaO_2$ mol ratio decreases in a non-linear fashion.

Typically, the dolomitic quicklime may be obtained from commercial sources (such as the Marblehead Lime Company or Pfizer Chemical Company) as derived from a natural, domestic dolomite. As received, the dolomite has a large particle size on the order of from 1 to 2 inches in diameter (1 inch × 0 to 2 inches × 0), and may contain more or less than the critical $CO_2$ content. These large particles may then be processed by calcining in a gas-fired tunnel kiln at temperatures between 1,900°–2,000°F for a period of four hours to form DQL. This product should be unslaked. The kiln product is then crushed to below ¼ inch in a jaw crusher, and then to below about 40 mesh. preferably below 80 to 100 mesh in a hammer mill. Optionally, the DQL may be purchased commercially, and if necessary crushed to the appropriate mesh size. The DQL should be assayed for $CO_2$ content after calcining and crusing, or upon receipt in the case of commerical DQL, to insure meeting the criteria for the final mixtures. The $CO_2$ content can be controlled by adjusting the length and temperature of the calcining schedule. The dolomite is a natural mineral composed of calcium and magnesium carbonates. The corresponding "natural" dolomitic quicklimes typically range from 3:1 to 1:3 MgO/CaO on a mole to mole basis. While we prefer to use a natural compound containing MgO and CaO, prepared mixtures or compounds of MgO and CaO may be substituted in place of the dolomitic quicklime in accordance with this invention.

The $BaO_2$ is also commerically available (e.g., Barium & Chemicals, Inc. or Baker Chemical Co.), and is preferably below about 100 mesh. Technical or reagent grade $BaO_2$ is satisfactory, but more crude forms may be obtained and purfied by known processes. BaO may be employed, but must be converted to $BaO_2$ to maintain the activity, integrity, and stability of the mixture with DQL. The $BaO_2$ should be routinely assayed to determine that its $CO_2$ content is low enough to assure negligible loss in activity. Where the $CO_2$ content is high, the $BaO_2$ may be heated to from about 850°–950°C to drive off the $CO_2$. If the $BaO_2$ is melted or becomes sintered, it must be reground to the desired mesh. $BaO_2$ also is available as a hydrated $BaO_2 \cdot 8H_2O$, which evolves the hydrated water at 100°C. Anhydrous $BaO_2$ is preferred, and as referred to herein, $BaO_2$ means anhydrous $BaO_2$.

While various forms of the mixture may be used, e.g., loose powder in fluidized bed, pellets, or a supported mixture, we prefer to use a pellet form. However, discoveries in connection with pellet forms of our mixture are not part of this generic invention, and are disclosed and claimed in a co-pending application filed of even date herewith, Ser. No. 241,957, the disclosure of which is incorporated herein by reference.

EXAMPLES 1 – 5

A series of five mixtures having DQL - $BaO_2$ weight ratios of 9.0, 4.0, 2.3, 0.67, and 0 were prepared, in which the $BaO_2$ is −100 mesh and DQL is −200 +325 mesh. These weight ratios correspond respectively to 90/10, 80/20, 70/30, 40/60, and 0/100 weight percent ratio mixtures. In a series of test runs, 80 psig air was used for oxidation, and 2 psig air was used for reduction at a temperature of 1,450°F, ±15°F, and the effect of carbon dioxide content on activity and maximum cyclic conversion of the DQL-$BaO_2$ mixture was ascertained by weight change measurements made in a thermobalance. In order to obtain controlled amounts of carbon dioxide in the mixtures, a special sample of incompletely calcined DQL was assayed for the carbon dioxide content. This DQL was then added in measured amounts to a completely calcined DQL sample, which had been assayed and found to have essentially no carbon dioxide therein, to provide a series of samples having a final $CO_2/BaO_2$ mole ratios in the range of from 0 to 1.0.

These tests, and others discussed below, were run in a standard thermobalance (thermogravimetric balance) of the following general construction. The sample contained in a porous (wire screen) basket is suspended in a heated reaction zone by a wire attached to a weight sensitive transducer located in the upper, colder portions of the reactor. Gas of the desired composition is passed over the suspended sample, reacting it and changing its weight. The transducer transmits these weight changes to a recorder producing a continuous weight record which can be used to determine the particular reaction rate being studied. With the thermobalance, it is possible to continuously monitor the weight change due to reaction of a solids sample and by simple calculation determine the conversion percent and/or rate.

From the run data the relationship between the maximum cyclic conversion of $BaO_2$ in percent and the $CO_2/BaO_2$ mole ratio was determined. This relationship, for representative weight % values of DQL and mole ratios of $CO_2/BaO_2$, is set forth in tabular form in Table 1.

above the "best-fit" curve C, whereas the mixtures of DQL - $BaO_2$ lying below and to the left of "best fit" curve C are active mixtures which may be used in Brin-type processes in accordance with this invention.

Surprisingly, as the weight percent DQL increases in the mixtures in accordance with this invention, the mole ratio of $CO_2/BaO_2$ must be decreased to render the mixture active, and must be decreased in a non-linear fashion in accordance with the curves shown.

Within the region of active mixtures to the left and below curve C in FIG. 2, we prefer the mixtures shown in the area lined between curve D and the horizontal line which intercept the DQL ordinant at about 30%. These mixtures show superior activity in terms of conversion, reduced cycle time and oxygen production, and are therefore preferred mixtures. Curves C and D can be mathematically approximated from the empirical data as follows:

Curve C:

$$\text{Wt. \% } DQL = [1500(1-Z)]/(16-15Z); \quad 0 \leq Z \leq 1 \tag{1}$$

Curve D:

$$\text{Wt. \% } DQL = (1{,}272 - 1500Z)/(13.72 - 15Z); \quad 0 \leq Z \leq 0.82 \tag{2}$$

where $Z = $ mole $CO_2$/mole $BaO_2$. This will permit one to determine the maximum amount of DQL permissible in a final mixture to prevent it from being inactive, or to be one of the preferred mixtures. The above equations may be rearranged to determine the maximum permissible $CO_2$ in a mixture of a given weight % DQL.

Table 1

EFFECT OF CARBON DIOXIDE CONTENT ON ACTIVITY OF DQL-BARIUM PEROXIDE MIXTURES

| Example Number | Weight % DQL in Mixture | Maximum Cyclic Conversion, Percent Each of the Following Mole Ratios $CO_2/BaO_2$: | | | | | | | | | | |
|---|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 |
| 1 | 0 | 65.4 | 59.0 | 52.5 | 45.9 | 39.2 | 32.8 | 26.1 | 19.7 | 13.0 | 6.5 | 0* |
| 2 | 40 | 62.6 | 56.0 | 49.5 | 42.9 | 36.2 | 29.9 | 23.2 | 16.6 | 10.1 | 3.5 | 0 |
| 3 | 70 | 55.3 | 48.6 | 42.1 | 35.5 | 29.0 | 22.4 | 15.9 | 9.2 | 2.7 | 0 | 0 |
| 4 | 80 | 47.9 | 41.3 | 34.8 | 28.1 | 21.6 | 15.0 | 8.4 | 1.9 | 0 | 0 | 0 |
| 5 | 90 | 25.6 | 19.0 | 12.6 | 6.0 | 0 | 0 | 0 | 0 | 0 | 0 | 0 |

*A zero cyclic conversion value indicates no activity.

Figure 3:
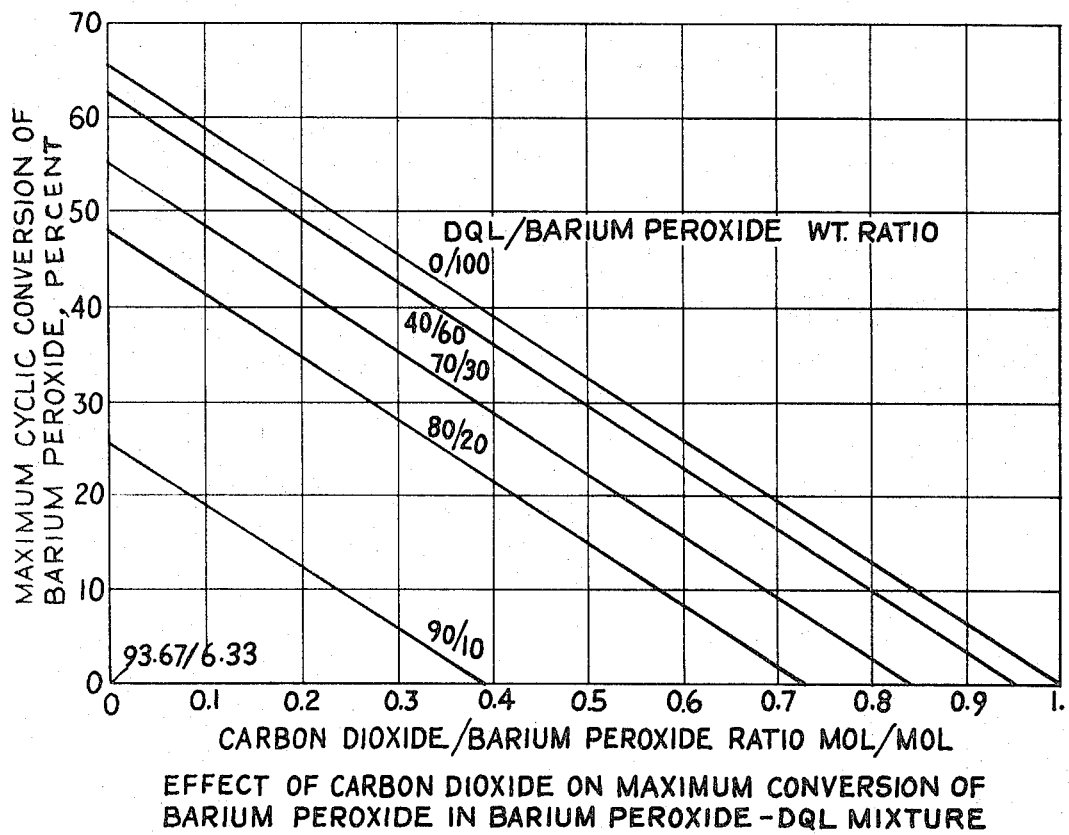

These values may be plotted graphically, the maximum cyclic conversion of $BaO_2$ in percent as a function of the $CO_2/BaO_2$ ratio in mol/mol to produce a series of negative slope straight lines, as shown on FIG. 3. The X-axis intercept for each mixture is the critical $CO_2$ content ratio which should not be exceeded. This value is 0.95 for a 40/60 mix, 0.84 for a 70/30 mix, 0.73 for an 80/20 mix, and 0.39 for a 90/10 mix. Critical values for other mixtures may be determined by graphical interpolation or simple testing following the above described procedures. These examples also illustrate the inverse relationship between $CO_2/BaO_2$ mole ratio and cyclic conversion.

Figure 2:
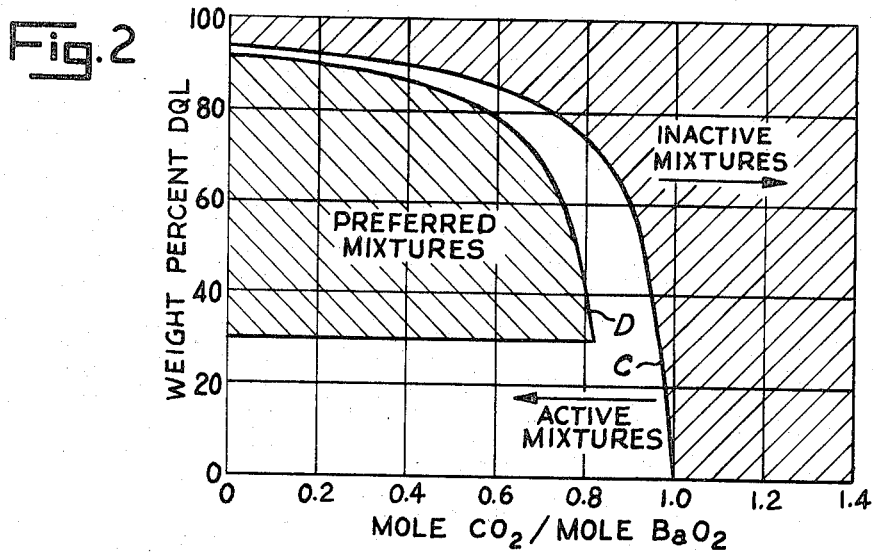

FIG. 2 illustrates both active and preferred mixtures in accordance with this invention in terms of the weight percent DQL in the mixture as a function of the mole $CO_2$/mole $BaO_2$ ratio, with the weight percent DQL lying between 0 to 100%, and the mole ratio of $CO_2/BaO_2$ in the mixture ranging from 0 to 1.0. We have discovered that inactive materials lie to the right and

EXAMPLE 6

A second series of tests were run using the thermobalance as above described. In this series, various weight ratios of dolomitic quicklime to barium oxide ranging from 0/100 through 100/0 were used. Also various types of dolomitic quicklimes were used in order to vary the percentage ratio of MgO to CaO. Activities of the resultant dolomitic quicklime-barium peroxide mixtures were determined. The oxidation pressure was as above, 80 psig air, and reduction pressure was 2 psig air. The barium peroxide used was $-100$ mesh, the DQL was $-200 +325$ mesh, and the temperature of operation was $1{,}450°F \pm 15°F$.

The results of these series of tests are shown in a tri-linear graph in FIG. 1. Each apex of the graph represents the pure compound as indicated. The rulings parallel to a side of the triangle measure the mole fraction of compound identified at the opposite apex. A binary mixture is represented by a point on a side of the triangle. In particular, all dolomitic quicklime compositions have values lying on the horizontal base of the triangle. In terms of preferred activity, those compounds having compositions falling between the upper curved line A and the lower curved line B on the graph are compounds falling within the scope of this invention. Each point on the graph represents one of the runs of this example, as indicated by the numbers 1 – 21 associated with the data points on the graph.

The upper curve A intercepts the MgO-BaO$_2$ binary (left side of triangle) at 0.57, i.e. 57% BaO$_2$, intercepts the equimolar MgO-CaO line (vertical height) at 0.69, i.e. 69% BaO$_2$, and intercepts the CaO-BaO$_2$ binary (right side of triangle) at 0.75, i.e. 75% BaO$_2$. The lower curve B intercepts the MgO-BaO$_2$ binary at 0.05, i.e. 5% BaO$_2$; intercepts the equimolar MgO-CaO line at 0.02, i.e. 2% BaO$_2$; and intercepts the CaO-BaO$_2$ binary at 0.07, i.e. 7% BaO$_2$. There is no intercept of either curve along the MgO-CaO binary.

EXAMPLE 7

Another series of runs was made under the conditions described above to determine the effect of particle size and concentration of DQL on the activity of barium peroxide. The barium peroxide used in the mixture was —100 mesh, and the oxidation pressure, reduction pressure, and temperatures were as above stated. In this series of tests, the percentage cyclic conversion and weight ratio of DQL to barium peroxide was predetermined. The particle size of the DQL was varied to determine the effectiveness of the mixture in terms of the cycle time in minutes, and oxygen production in standard cubic feet per hour-pound of barium peroxide. The cycle time and oxygen were determined from thermobalance data.

presently preferred particle size range of the DQL ranges from —200 to +325 mesh, but may be on the order ob 40 mesh or larger. For the 80/20 mix of our invention, the oxygen production in standard cubic feet per hour-pound BaO$_2$ is more than 11.5 times that for straight barium peroxide (compare runs 1 and 4). The cycle time also drops from 9.2 minutes to 1.6 minutes, a 600% improvement in cycle time (a drop from 552 seconds to 96 seconds).

Test run 5 is also a comparative example showing that pure DQL showed no activity by itself. From the comparison of runs 1 and 5 with run 4, we believe the DQL properly may be termed a promotor. Since the mixture shows such startling and improved results, it also properly may be termed synergistic. A mathemetical treatment of typical run data shows that some the BaO$_2$ is apparently bound by the DQL in a ratio of about 3 moles BaO$_2$ per 100 moles of DQL, and may in part be responsible for the observed increase in activity.

Runs 4, 6 and 7 compare the effect of particle size on the activity of the mixture. In all three runs, the weight ratio of DQL/BaO$_2$ was fixed at a ratio of 80/20 (4:1) and the cyclic conversion percentages were held constant. The particle size of the DQL was increased from the range of —200 +325 to —40 +80. It is significant that as the DQL particle size was increased, the cycle time doubled and the oxygen production dropped to one-half of test run 4. A comparison of runs 6 and 7 shows that although above the particle size range of —80 +200 mesh for a given cyclic conversion the cycle time and oxygen production is relatively constant, a 40 mesh size DQL still yields a commercially suitable oxygen production rate.

TABLE 2

EFFECT OF PARTICLE SIZE AND CONCENTRATION OF CALCINED DOLOMITE (DQL) ON ACTIVITY OF BARIUM PEROXIDE

| | Test Conditions | | Variable Studied | Test Results | |
|---|---|---|---|---|---|
| Test Run Number | Wt. Ratio DQL-BaO$_2$ | Cyclic Conversion % Chosen | Particle Size of DQL, USS Sieve | Cycle Time, Min. | Oxygen Production, SCF/hr.-lb. BaO$_2$ |
| 1 | 0/100 | 10.6 | N.A. | 9.2 | 0.77 |
| 2 | 20/80 | 21.2 | —200 + 325 | 7.8 | 1.81 |
| 3 | 60/40 | 15.9 | —200 + 325 | 2.8 | 3.80 |
| 4 | 80/20 | 21.2 | —200 + 325 | 1.6 | 8.87 |
| 5 | 100/0 | 0 | —200 + 325 | N.A. | 0 |
| 6 | 80/20 | 21.2 | —80 + 200 | 3.3 | 4.35 |
| 7 | 80/20 | 21.2 | —40 + 80 | 3.2 | 4.44 |

Run No. 1 is a comparison run showing the activity of barium oxidebarium peroxide. No DQL was used. For a cyclic conversion of 10.6%, a cycle time of 9.2 minutes results, which corresponds closely to the best values reported for the basic Brin process. The oxygen production is also a low 0.77 standard cubic foot per hour-pound barium peroxide. This confirms the present-day commercial impracticality of the basic Brin process.

Test runs 2 – 4 illustrate that as the weight of dolomitic quicklime in the mixture is increased from 20 to 80%, at a constant size range of between —200 to +325 mesh, the cycle time drops and oxygen production increases dramatically, even when the percent cyclic conversion is prechosen to be from 50 to 100% higher than with pure barium oxide-peroxide (run 1). The

OPERATION OF A TYPICAL PROCESS USING THE ACCEPTOR MIXTURES OF THIS INVENTION

In operation, the DQL-BaO$_2$ oxygen acceptor composition of our invention is charged into a suitable reactor and gradually heated up to the operating temperature range of from 1,350° – 1,600°F for commencing the operation at the reduction (oxygen production) half of the cycle. Air is pumped through the reactor at a pressure in a range of from 1–50 psia at which time the BaO$_2$ of the initial mixture is converted by reduction to BaO + ½ O$_2$. The air is let in for from about 0.8 to 4.0 minutes; the BaO$_2$ is stripped of (releases) its combined oxygen to the purging air. The purging air leaves the reactor enriched to as much as 40% total oxygen concentration, and may be used as such directly in the various industrial processes described above. In the alternative, rather than purging the bed with air, the inlet side of the reactor may be valved closed, and a vacuum drawn to produce substantially pure oxygen.

The reactor is then switched to the oxidation half of the cycle with air passing either co-currently or counter-currently, relative to the direction of flow during the reduction, through the bed at a pressure of from 40 – 200 psia at the bed temperature of from 1,300° – 1,550°F. During the oxidation half, the barium oxide then in the bed mixture combines with one-half $O_2$ to produce barium peroxide. The time range for this half of the cycle is substantially the same as for the reduction half of the cycle. The air-depleted in oxygen may be ejected as waste gas to the atmosphere, or may be used in further processes to recover the nitrogen gases or energy therefrom.

As with other Brin-type processes, both the water vapor and carbon dioxide should be removed from the air let into the reactor, for example, by passing the air through various guard chambers containing conventional $CO_2$ and water absorbents.

The improved composition mixtures of our invention may be used in fluidized or static beds. We presently prefer to use them in a static bed, and such a bed does not require periodic raking, rabbling, or "turning" to move the bed material which is closest to the inlet into the interior of the bed. For fluidized bed operation we prefer to first mix the $BaO_2$ with DQL, compress the mixture into briquettes, and crush the briquettes to the desired powder size. The preferred powder is thus a powder of $BaO_2$-DQL, rather than particles of $BaO_2$ mixed with particles of DQL. This assists in inhibiting the tendency of $BaO_2$ to plate out of the mixture on reactor surfaces during fluidized operation.

The improved compositions can be used in accordance with the above operation with either the temperature or the pressure variations of the Brin process, or with various combinations of both temperature and pressure.

It should be understood that the terms "mixture" and "composition" are used herein in a broad, generic sense, and are not meant to connote a particular final form of the acceptor material as used in a process. Thus the terms encompass the defined acceptor materials of this invention whether they be loose mixtures, frits, pellets, crystal mixtures, solid solutions in whole or in part, coatings of $BaO_2$ on DQL, or coatings of any phase or form on an inert support, regardless of the final shape or form. Likewise, the term "stripping" refers broadly and generically to the mechanism of oxygen removal from the $BaO_2$ during the reduction half of the cycle, whether the function by physical desorption (reverse of adsorption) or involve chemical bond breaking, and includes the prior art loose use of the term "desorption."

PREPARATION OF DQL-$BaO_2$ MIXTURES

An important advantage of the mixture of our invention which should not be minimized is the fact that the mixture is easy to prepare from readily available commercial materials. The DQL-$BaO_2$ mixture can be shipped with minimal precautions and stored over long periods of time without loss of activity. The mixture does not require preactivation and can be used directly in reactors without long, expensive and complicated calcination or reactivation procedures.

Heretofore, barium oxide has been used and has presented extremely complex problems in the preparation, shipment and storage. Barium oxide is highly hygroscopic, forming barium hydroxide with water vapor from the air. Compositions employing barium oxide pick up so much water that they become moist and lost their integrity. Reactors packed with such material tend to cake and become impervious to the flow of gas therethrough. Likewise, such material can become so caked during shipment or storage as to be relatively useless.

Further, barium oxide used alone or with other materials is susceptible to carbonation (the formation of barium carbonate) during preparation, transport and storage. The barium carbonate is substantially inactive in Brin-type processes. We have discovered that carbonation of barium oxide over a period of time is a major factor in inactivation of beds, and in shortening the shelf life of stored barium oxide-containing materials. In contrast, our DQL-$BaO_2$ mixture exhibits long lifetimes without the disadvantages of both hydration and carbonation. Likewise, during extensive continuous cyclic operation the material of our invention retains its full activity without loss of integrity. We have not yet observed any limitations on either shelf life or cycle lifetime, over a year of storage and 9 months of operation.

By way of example, powdered BaO and an 80/20 mixture of DQL and $BaO_2$ powders were exposed to ambient atmosphere to observe weight gain due to hydration and/or carbonation. The BaO showed a 175% weight gain in 23.5 hours, whereas the DQL/$BaO_2$ gained only 1.4% in 116.5 hours. The weight gain was found to be ascribable to the DQL, since in 162 hours a sample of DQL gained 2.3% of its weight.

The powder, granules, pellets or supported forms of the mixtures of our invention may be prepared under commercial factory conditions, bagged, shipped and stored over long periods of time at the point of use without danger of inactivation. Of course, the material should not be abused, and it is prudent to afford it basic protection from harsh conditions of water and high $CO_2$ atmospheres, such as by using conventional self-sealing drums, plastic lined, resin impregnated paper bags, or other sealed containers. When ready for use, the bags or drums of acceptor composition in accordance with this invention may be dumped directly into the reactors and put on stream as fast as they can be heated up. No special activation, chemicals or procedures are required.

A corollary of our discoveries in this regard is that in operation, when a reactor must be shut down for whatever reason, for example, for repairs or for stopping production through termination of need, the bed mixture should be oxidized to insure that the barium is in the peroxide state. The reactor can then be cooled and left as such for future use, or the mixture may be removed for transport or storage.

In contrast to the complex crystallites heretofore suggested by the prior art, no expensive chemical preparations or decomposition steps are required in the preparation of the compositions of our invention. Only simple blending and, optionally, compaction of the two raw materials is required. Likewise, extreme criticality in physical arrangement of reaction bed and rapid evacuation procedures do not appear the case with our composition.

In operation, the DQL has a high specific heat relative to that of the barium oxides. This results in an important advantage of the composition in accordance with this invention; the DQL serves to store heat during the exothermic oxidation half of the cycle. This heat is then ready within the bed itself for release during endothermic reduction. This reduces the overall temperature fluctuations within the bed which is detrimental to cyclic operation and gas conversions. More importantly, this results in being able to omit the use of heat exchange equipment for removal or addition of the large heat of reaction.

As noted above, the use of the DQL improves the activity of the barium oxide in cyclic operation and allows operation at cycle times on the order of 1–2 minutes as compared to 3–4 hours in the basic Brin process and 10 minutes for pure barium oxide. This in turn permits a significant reduction in the amount of barium oxide required to produce oxygen at any given rate.

It should be understood that within the spirit of this invention, one or ordinary skill in the art can make various modifications yet remain within the scope of this invention. We therefore wish the scope of the invention to be determined by the appended claims, interpreted in the light of this specification if need be, as broadly as the prior art will permit.

We claim:

1. In a method of producing oxygen by alternately contacting air with an oxygen acceptor composition and thereafter stripping said oxygen from said composition, under conditions effecting reversible acceptance and removal of oxygen therefrom.

the improvement which comprises using as said acceptor composition a mixture of $BaO_2$, $MgO$, and $CaO$ in which the mole ratio of $CO_2$ to $BaO_2$ is less than 1.0, and the mole percentages of $CaO$, $BaO_2$ and $MgO$ lie between the curves A and B in FIG. 1.

2. A method as in claim 1 wherein said mixture is a binary composition of $BaO_2$ with a compound of the oxides of Mg and Ca.

3. A method as in claim 2 wherein said Mg and Ca oxides compound is derived from a naturally occurring dolomite.

4. A method as in claim 3 wherein the weight ratio of said Mg and Ca oxides compound to $BaO_2$ ranges from about 30/70 to about 92/8.

5. A method as in claim 3 wherein said Mg and Ca oxides compound is a dolomitic quicklime.

6. A method as in claim 5 wherein said composition is formed from dolomitic quicklime in discrete particles of size below about 40 U.S. mesh.

7. A method as in claim 1 wherein said conditions include cyclically varying pressure at relatively constant temperatures.

8. A method as in claim 1 wherein said conditions include pressure in the range from 40–200 psia and temperature of from 1,300°F to 1,500°F during acceptance of oxygen, and pressure in the range of from 1–50 psia and temperatures of from 1,350°F to 1,600°F during stripping.

9. A method as in claim 1 wherein said mixture is in a form selected from (a) finely divided discrete particles, (b) granules, (c) pellets, and (d) a coating on an inert support.

10. A method as in claim 5 wherein the weight percent of said dolomitic quicklime in the mixture is selected in accordance with the relationship:

Weight % DQL $\leq [1500(1-Z)]/(16-15Z)$ where $Z$ = mole $CO_2$/mole $BaO_2$ in the mixture, and $0 \leq Z \leq 1$.

11. A method as in claim 10 wherein said composition is formed from dolomitic quicklime in discrete particles of size below about 40 U.S. mesh.

12. A method as in claim 11 wherein said dolomitic quicklime particles are below about 80 U.S. mesh.

13. A method as in claim 12 wherein said dolomitic quicklime particles are in the range of from −200 to +325 U.S. mesh.

14. A method as in claim 10 wherein said composition is formed from $BaO_2$ in discrete particles of size below about 100 U.S. mesh.

15. A method as in claim 5 wherein the weight percent of said dolomitic quicklime in the mixture is an amount of about 30 weight % selected in accordance with the relationship:

Weight % DQL $\leq (1272 - 1500Z)/(13.72 - 15Z)$, where $Z$ = mole $CO_2$/mole $BaO_2$ in the mixture, and $0 \leq Z \leq 0.82$.

16. A method as in claim 15 wherein said composition is formed from dolomitic quicklime in discrete particles of size below about 40 U.S. mesh.

17. A method as in claim 16 wherein said dolomitic quicklime particles are below about 80 U.S. mesh.

18. A method as in claim 17 wherein said dolomitic quicklime particles are in the range of from −200 to +325 U.S. mesh.

19. A method as in claim 15 wherein said composition is formed from $BaO_2$ in discrete particles of size below about 100 U.S. mesh.

20. A method as in claim 11 wherein said mixture is in a form selected from: (a) finely divided discrete particles, (b) granules, (c) pellets, and (d) a coating on an inert support.

21. A method as in claim 16 wherein said mixture is in a form selected from: (a) finely divided discrete particles, (b) granules, (c) pellets, and (d) a coating on an inert support.

* * * * *